R. E. HELLMUND.
DYNAMO ELECTRIC MACHINE.
APPLICATION FILED JAN. 10, 1916.

1,327,820.                                 Patented Jan. 13, 1920.

WITNESSES:
H. G. Funk
W. R. Coley

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,327,820.  Specification of Letters Patent.  Patented Jan. 13, 1920.

Application filed January 10, 1916. Serial No. 71,199.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to alternating-current machines of the compensated, commutator type, and it has for its object to provide means and apparatus whereby the compensating field form in machines of the character described may be so adjusted in shape and in magnitude as to at all points substantially neutralize the armature field, thus permitting but little sparking and insuring satisfactory operation.

Figure 1:
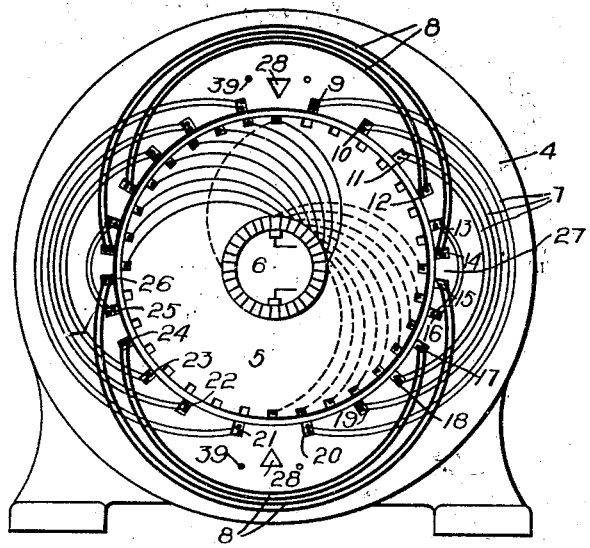
Figure 2:
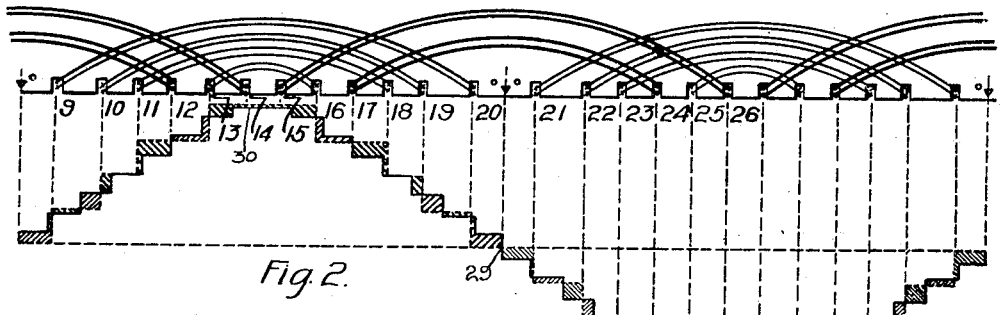
Figure 3:
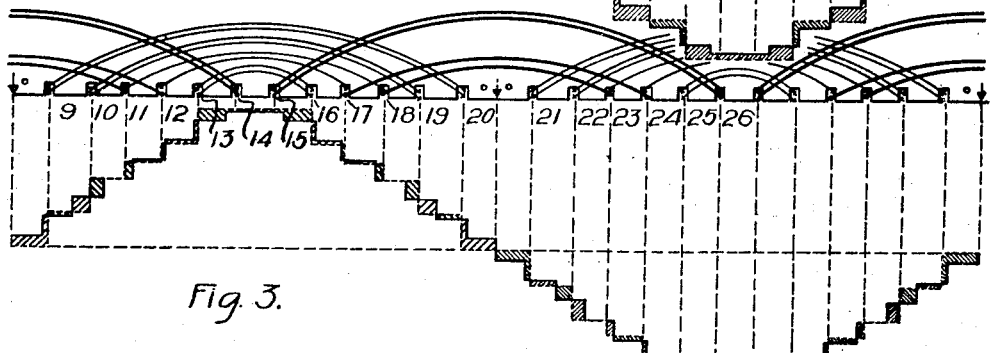

In the accompanying drawing, Figure 1 is a diagrammatic view of a dynamo-electric machine of the compensated, commutator type provided with distributed stator field windings embodying a preferred form of my invention; Fig. 2 is a diagram illustrating the close coincidence in field form between the armature and cross field magnetomotive forces in the machine of Fig. 1, and Fig. 3 is a diagram illustrating another arrangement of windings whereby an even closer coincidence of field forms may be produced.

In alternating-current dynamo-electric machines, particularly motors of the single-phase, commutator type which are provided with a distributed cross field winding, favorable conditions for commutation and a low power factor are obtained only if the following conditions exist. (1) The distribution of the field set up by the armature winding must be substantially the same as the distribution of the field set up by the cross-field stator winding. (2) The cross field strength in the commutating zone should be equal to, or preferably slightly greater than, the armature strength in this zone.

The above conditions are fulfilled but imperfectly in the ordinary single-phase motor because the field form of the armature flux is substantially triangular in shape, whereas the usual location of the large, concentrated, exciting field windings employed precludes the placing of any cross-field turns to provide the apex of a cross-field flux triangle of equal size. Consequently, the field form of the stator cross-field flux is more or less trapezoidal in form and, in order to raise the crest of said trapezoid to or above the apex of the armature-field flux triangle, as required by the commutating conditions, marked over-compensation at the sides of said trapezoid is necessary.

It has been proposed to chord the armature winding so as to cause the field form of the armature flux to assume a trapezoidal shape and, in this manner, the desired coincidence in field forms and resultant close compensation have been obtained but at the loss of weight efficiency in the machine because all chording systems involve periodic times of inactivity in each and every armature conductor.

By my invention, I so break up and distribute the exciting field winding as to provide space for appropriate cross field turns immediately adjacent to the commutating zone and, in this manner, I am enabled to provide a cross field flux of triangular shape that satisfactorily neutralizes the armature flux of a substantially full pitch as well as a chorded armature winding and obtain good commutation in a machine operating at maximum-weight efficiency.

Referring to the accompanying drawing for a more detailed understanding of my invention, I show the stator of a single-phase alternating-current motor at 4 in Fig. 1. The stator 4 is of the usual slotted type and embraces an armature 5 provided with a winding connected to a commutator 6 and chorded one slot. The stator 4 is provided with a distributed cross-field winding 7 and with a distributed exciting field winding 8.

Assuming that the stator 4 is provided with twenty-four slots and that the slots in a 270° arc thereof are numbered from 9 to 26, inclusive, as shown; the cross-field winding 7 is so disposed that two coils thereof lie in the slots 9 and 20, two in the slots 10 and 19, two in the slots 11 and 18 and two in the slots 13 and 16. In like manner, the exciting field winding 8 comprises a pair of coils in the slots 15 and 26 and a pair of coils in the slots 17 and 24.

Considering the lower right-hand quadrant of the stator 4, if one starts at the point 27 at the center of a cross-field pole, the slot 15 is first encountered bearing conductors of the exciting field winding. Next lies the slot 16 bearing conductors of the cross-field winding, and then the slot 17 bearing more conductors of the exciting field winding. The remaining slots 18, 19 and 20 are provided with cross-field conductors. It will be noted that the stator slots toward the center of the exciting field poles are more widely spaced than those at the center of the cross-field poles assisting in the proper cross-field distribution and, at the same time, permitting the insertion of ventilating spaces 28 and of lamination rivets 39 at the centers of the exciting poles without causing undue flux saturation.

Referring to Fig. 2, wherein the stator winding of Fig. 1 is shown in developed form with similarly numbered slots, the armature flux is shown by a stepped full line 29—30. The field form of the cross-field winding is shown as substantially coincident therewith, being drawn in dotted lines and the differential areas being shaded downwardly toward the right or toward the left in accordance with the predominance of the armature flux or the cross-field flux. The areas of the two types of shading are substantially equal. While the two field forms are shown as coincident for ready comparison, it will be understood that they are in reality opposed to each other to obtain the usual compensating effect. Proceeding to the left from the point 29, the various steps (dotted-line) representing cross-field flux are equal in height and are located opposite the stator slots containing the pairs of cross-field-winding conductors. The several steps (solid-line) representing armature flux are located opposite the positions of the respective armature slots (not shown). The armature steps are equal except in the commutating zone, where half-steps obtain. The effect of the conductors in the slots 15 is to raise the cross-field strength in the commutating zone to a higher value than that of the armature flux, thus providing for good commutation.

The winding shown in Fig. 3 is, in all essential respects, the same as that shown, in Figs. 1 and 2 with the exception that each of the slots 11, 12, 17 and 18 bears a cross-field conductor and an exciting-field conductor, as contrasted with Fig. 2, wherein the slots 12 and 17 bear only exciting-field conductors and the slots 11 and 18 bear only cross-field conductors. The result of this more pronounced distribution of field conductors is to produce a closer field-form coincidence under the slots 17 and 18. In this case, the cross-field flux steps (dotted-line) are of the same height as those in Fig. 2 wherever two conductors of the cross-field winding are contained in the same stator slot, and are of one-half that height wherever only one of such conductors occurs in a slot.

While I have shown my invention in its preferred form, it will be obvious to those skilled in the art that it is capable of various minor changes and modifications without departing from the spirit thereof and I desire, therefore, that only such limitations shall be placed thereupon as are imposed by the prior art or are indicated in the appended claims.

I claim as my invention:

1. A stator member for a dynamo-electric machine of the compensated commutator type provided with a plurality of slots the spacing of which is materially less in each commutating zone than midway between the zones, and distributed exciting and cross-field windings in said slots, some of the cross-field-winding conductors in each commutating zone being located in slots between slots containing exciting-field-winding conductors.

2. A stator member for a dynamo-eletric machine of the compensated commutator type provided with a plurality of slots the spacing of which is materially less in each commutating zone than midway between the zones, and distributed exciting and cross-field windings in said slots, some of the cross-field-winding conductors in each commutating zone being located in slots between slots reseptively containing only exciting-field-winding conductors and containing both kinds of field-winding conductors.

3. A stator member for a dynamo-electric machine of the compensated commutator type provided with a plurality of slots for containing distributed exciting and cross-field-winding conductors, the exciting field conductors completely occupying certain slots in the commutating zones and occupying other slots in conjunction with cross-field-winding conductors, the remaining and non-consecutive slots being completely occupied by cross-field-winding conductors.

In testimony whereof I have hereunto subscribed my name this 21st day of Dec., 1915.

RUDOLF E. HELLMUND.